United States Patent
Hsieh et al.

(10) Patent No.: US 11,315,574 B2
(45) Date of Patent: Apr. 26, 2022

(54) MOBILE DEVICE, SYSTEM AND METHOD FOR TASK MANAGEMENT BASED ON VOICE INTERCOM FUNCTION

(71) Applicant: Wistron Corporation, New Taipei (TW)

(72) Inventors: Hui Chi Hsieh, New Taipei (TW); Yu-Chen Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/924,220

(22) Filed: Jul. 9, 2020

(65) Prior Publication Data

US 2021/0366490 A1 Nov. 25, 2021

(30) Foreign Application Priority Data

May 22, 2020 (TW) ................................ 109117134

(51) Int. Cl.
*G10L 17/06* (2013.01)
*G10L 17/02* (2013.01)
*G06F 3/16* (2006.01)

(52) U.S. Cl.
CPC .............. *G10L 17/06* (2013.01); *G06F 3/167* (2013.01); *G10L 17/02* (2013.01)

(58) Field of Classification Search
CPC .......... G10L 17/06; G10L 17/02; G06F 3/167
USPC ....................................................... 704/246
See application file for complete search history.

(56) References Cited

U.S. PATENT DOCUMENTS

| | | | |
|---|---|---|---|
| 8,521,203 B2 | 8/2013 | Veh | |
| 8,954,499 B2* | 2/2015 | Archbold | G06F 9/4881 709/204 |
| 2010/0285779 A1* | 11/2010 | Yeh | H04W 84/027 455/413 |
| 2012/0208550 A1* | 8/2012 | Proietti | H04W 4/02 455/456.1 |
| 2017/0091717 A1* | 3/2017 | Chandraghatgi | H04L 12/1895 |
| 2017/0352008 A1* | 12/2017 | Gao | G06Q 10/1097 |
| 2018/0225620 A1* | 8/2018 | Cantrell | G06Q 10/0633 |
| 2019/0129749 A1* | 5/2019 | White | G06Q 10/109 |
| 2019/0135304 A1* | 5/2019 | Kim | B60W 50/14 |
| 2020/0004877 A1* | 1/2020 | Ghafourifar | H04L 67/22 |

(Continued)

FOREIGN PATENT DOCUMENTS

| | | |
|---|---|---|
| CN | 104573921 | 4/2015 |
| CN | 106802885 | 6/2017 |

(Continued)

OTHER PUBLICATIONS

"Office Action of Taiwan Counterpart Application", dated Jun. 21, 2021, pp. 1-12.

*Primary Examiner* — Edwin S Leland, III
(74) *Attorney, Agent, or Firm* — JCIPRNET

(57) ABSTRACT

A mobile device, a system and a method for task management based on voice intercom function are provided. A mobile device receives a voice message associated with at least one task. Semantic information of the voice message is analyzed to determine at least one message receiver of the voice message and generate a task message. Another mobile device corresponding to one of the at least one message receiver receives the task message. Task management information associated with the at least one task is updated according to the semantic information of the voice message.

18 Claims, 8 Drawing Sheets

(56) References Cited

U.S. PATENT DOCUMENTS

2020/0037059 A1\* 1/2020 Jenkins ................ H04R 1/1041
2021/0043095 A1\* 2/2021 Venkataraman ........ G10L 15/22

FOREIGN PATENT DOCUMENTS

| CN | 109684016 | 4/2019 |
|---|---|---|
| TW | 201041421 | 11/2010 |

\* cited by examiner

MOBILE DEVICE, SYSTEM AND METHOD FOR TASK MANAGEMENT BASED ON VOICE INTERCOM FUNCTION

CROSS-REFERENCE TO RELATED APPLICATION

This application claims the priority benefit of Taiwan application no. 109117134, filed on May 22, 2020. The entirety of the above-mentioned patent application is hereby incorporated by reference herein and made a part of this specification.

TECHNICAL FIELD

The disclosure relates to a voice communication technology, and more particularly, to a mobile device, a system and a method for task management based on voice intercom function.

BACKGROUND

The traditional radio intercoms (Walkie-talkie) are often used in certain occasions of activities or workplaces. The radio intercoms allow staff members to communicate with each other to confirm work progress or assign tasks, etc. The traditional radio intercoms (Walkie-talkie) require a talker and a listener to stay on a fixed communication channel so that they can talk and listen to each other. The traditional radio intercoms have limitations on signal transmission distance and are also restricted to the use of specific equipment. In addition, for general radio intercoms, a signal transmission is easily interfered by environmental factors such as forests, buildings, electromagnetic fields, etc., which in turn affects the call quality. Because the radio intercoms are only used to transmit a voice message, the conversation content of the radio intercoms cannot be kept as a backup record, that is, no call records or text messages will be left after the call is ended. Based on this, the contents of conversations made by using the traditional radio intercoms in the workplace cannot be further extended. On the other hand, since the traditional radio intercoms send and receive the voice message based on the same communication channel (communication frequency), the talker cannot transmit the voice message to one or more specific listeners through the radio intercom.

SUMMARY

In view of this, the disclosure provides a mobile device, a system and a method for task management based on voice intercom function, which can update task management information in a database according to semantic information of a voice message and realize a communication between mobile devices to provide a more flexible and convenient task management mechanism.

An embodiment of the disclosure provides a method for task management based on voice intercom function, the method includes the following steps. A mobile device receives a voice message associated with at least one task. Semantic information of the voice message is analyzed to determine at least one message receiver of the voice message and generate a task message. Another mobile device corresponding to one of the at least one message receiver receives the task message. Task management information associated with the at least one task is updated according to the semantic information of the voice message.

An embodiment of the disclosure provides a system for task management based on voice intercom function, which includes a first mobile device and a second mobile device. The first mobile device uses a voice receiving device to receive a voice message associated with at least one task. At least one message receiver and a task message is determined according to semantic information of the voice message. The second mobile device receives the task message, and the second mobile device corresponds to one of the at least one message receiver. The first mobile device or the second mobile device displays task management information of the at least one task, and the task management information of the at least one task is updated according to the semantic information of the voice message.

An embodiment of the disclosure provides a mobile device, which includes a display, a voice receiving device, a communication element, a storage device and a processor. The communication element is connected to a network. The processor is coupled to the display, the voice receiving device, the communication element and the storage device, and configured to execute the following steps. A voice message associated with at least one task is received by the voice receiving device. The communication element is used to receive task management information of the at least one task from an information management server, so as to display the task management information of the at least one task by using the display. The task management information of the at least one task is updated according to semantic information of the voice message.

Based on the above, in the embodiments of the disclosure, not only can users assign tasks and receive tasks through voice communication between the mobile devices, the task management information of the task may also be updated according to the semantic information of the voice message so that the updated task management information may then be displayed by the mobile devices. In this way, the convenience and efficiency for controlling the tasks and staff members can be greatly improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Some embodiments of the disclosure are described in details below by reference with the accompanying drawings, and as for reference numbers cited in the following description, the same reference numbers in difference drawings are referring to the same or like parts. The embodiments are merely a part of the disclosure rather than disclosing all possible embodiments of the disclosure. More specifically, these embodiments are simply examples of a method, a system and a device recited in claims of the disclosure.

Figure 1:
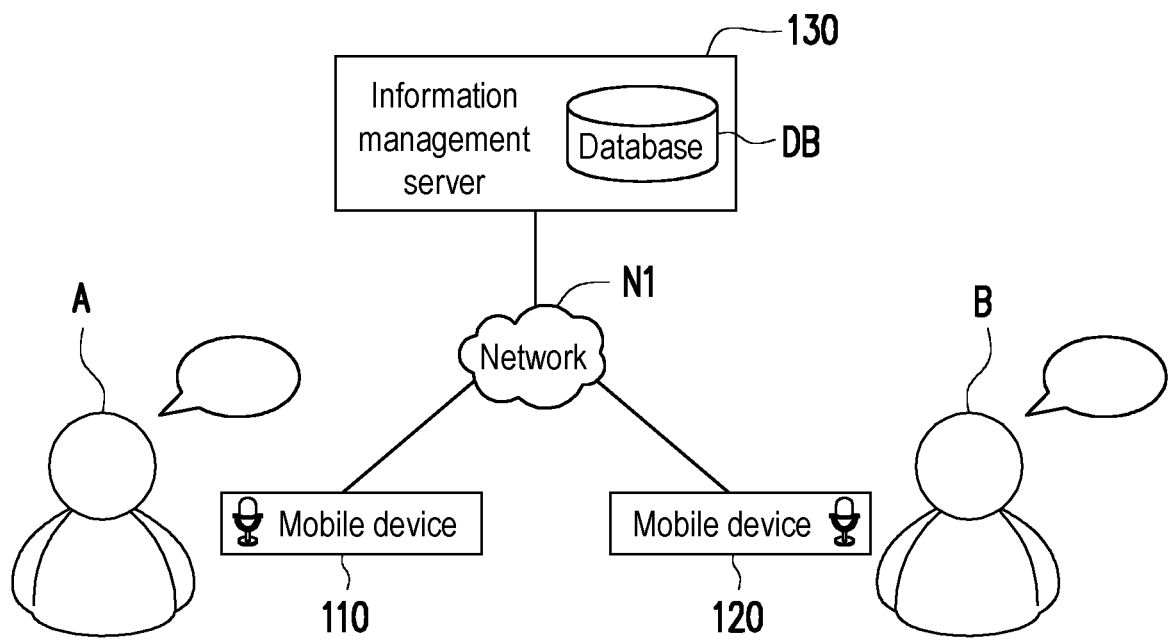
FIG. 1 is a schematic diagram of a system for task management according to an embodiment of the disclosure.

FIG. 1 is a schematic diagram of a system for task management according to an embodiment of the disclosure. Referring to FIG. 1, a system for task management 10 includes a mobile device 110, a mobile device 120 and an information management server 130. The mobile device 110 and the mobile device 120 are portable electronic devices such as smart speakers, smart watches, smart phones, tablet computers, or a combination of multiple portable electronic devices. Embodiments of the disclosure are not limited in this regard. The mobile device 110 and the mobile device 120 may be connected to the information management server 130 through a network N1. The network N1 may include a local area network (LAN) or a wide area network (WAN), such as a wireless wide area network supporting 3G, 4G, or 5G standards or a wireless local area network supporting Wifi standards, etc. Embodiments of the disclosure are not limited in this regard. In addition, the mobile device 110 and the mobile device 120 are electronic devices having a voice receiving function that can receive a voice message spoken by a user.

In an embodiment, a user A of the mobile device 110 may be a task manager, and a user B of the mobile device 120 may be a task executor. In this disclosure, both the task manager and the task executor may be referred to as staff members. The task manager can speak out the voice message to assign a task by using the mobile device 110, and the task executor can speak out the voice message to take the task by using the mobile device 120. In the disclosure, the task may be a routine task, a support task or other special tasks that need to be processed in various workplaces or activities. For example, in the workplace of hotel management, the task may be housekeeping or room services.

In an embodiment, the information management server 130 may serve as a communication bridge between the mobile device 110 and the mobile device 120. The information management server 130 may recognize user intentions and keywords in the voice messages received by each of the mobile device 110 and the mobile device 120 respectively, so as to generate task messages according to the user intentions and the keywords and determine a message receiver. In an embodiment, the information management server 130 may determine the message receiver according to semantic information of the voice message and a predetermined policy rule. In an embodiment, when the semantic information of the voice message includes a name keyword of a specific staff member, the information management server 130 may determine the specific staff member as the message receiver and send the task message to the mobile device held by the message receiver. Alternatively, in an embodiment, when the semantic information of the voice message includes a name of a department, the information management server 130 may determine the staff member under the department as the message receiver and send the task message to the mobile device held by the message receiver. Alternatively, in an embodiment, when the semantic information of the voice message includes location information of a geographic location, the information management server 130 may determine the staff member located at the geographic location as the message receiver and send the task message to the mobile device held by the message receiver. In this way, a task assignor can send the task message of a specific task to the mobile device of the specific staff member by speaking out the name, the location, the department or a group of the specific staff member and a task content.

In an embodiment, the information management server 130 may perform a semantic recognition for the voice messages respectively received by the mobile device 110 and the mobile device 120 to analyze the semantic information of the user A and the user B, and update task management information or/and staff management information in a database DB according to the semantic information of the voice message. Accordingly, the mobile device 120 of the user B who is the task executor may receive the updated task management information from the information management server 130 and display the updated task management information by its display. In this way, the task executor may learn of the task currently waiting to be processed through the system for task management 10, and take the task through the voice message to update the task management information of the task. In addition, the mobile device 110 of the user A who is the task manager may also receive the updated task management information or/and the updated staff management information from the information management server 130, and display the updated task management information or/and the updated staff management information by its display. In this way, the task manager may efficiently manage the tasks and the staff members in various workplaces or activities through the system for task management 10.

The database DB is, for example, a relational database, and records the task management information of the task and the staff management information of the staff member in a plurality of joint tables. The relational database is to express correlation between data in form of a list, and store the data in the list for easy query. The relational database can use SQL or a structured query language as a main communication interface. In an embodiment, the database DB records the staff management information of one or more staff members and the task management information of one or more tasks. The task management information of at least one task may include an execution status of the at least one task, a completed quantity and an uncompleted quantity of the at least one task, an execution time of the at least one task, an execution personnel of the at least one task or a combination thereof. The staff management information of at least one staff member includes an on-duty time, an off-duty time, a current working status, a number of tasks completed or a combination thereof. Based on this, in view of the execution status of the task (such as "Not processed", "Processed" or "Processing") displayed by the mobile device 120, the task executor may learn of which tasks are waiting to be processed. In view of the execution status (such as "Not processed", "Processed" or "Processing") and the execution personnel of the at least one task displayed by the mobile device 110, the task manager may learn of the execution status and the execution personnel of each task. In view of the current working status of the at least one staff member (such as "At work", "At rest" or "On vacation") displayed by the mobile device 110, the task manager can learn of the working status of each staff member to facilitate manpower scheduling.

It should be noted that, although two mobile devices 110 and 120 are used as an example for description in the embodiment of FIG. 1, the embodiment of the disclosure does not limit a total of mobile devices used. In other words, in an embodiment, the information management server 130 may send a corresponding task message to more than one mobile device in response to the mobile device 110 receiving the voice message.

Figure 2A:
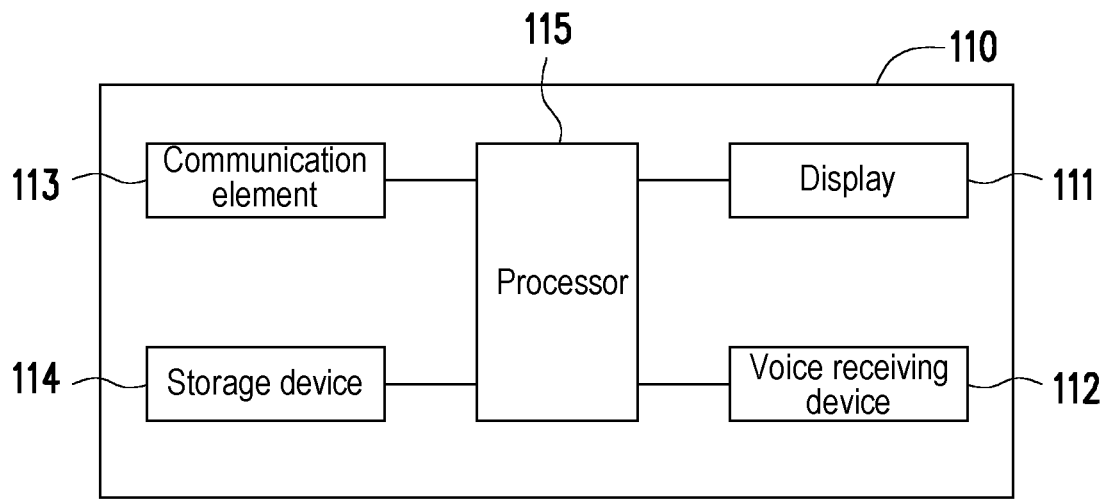
FIG. 2A is a schematic diagram of a mobile device according to an embodiment of the disclosure.

FIG. 2A is a schematic diagram of a mobile device according to an embodiment of the disclosure. Nonetheless, it should be understood that, the example of FIG. 1 is merely exemplary instead of limitations to the disclosure. Referring to FIG. 2A, the mobile device 110 is taken as an example for description, whereas the mobile device 120 may have similar hardware components. The mobile device 100 includes a display 111, a voice receiving device 112, a communication element 113, a storage device 114 and a processor 115.

The display 111 is, for example, a liquid crystal display (LCD), a light emitting diode (LED) display, a field emission display (FED) display, an organic light emitting diode (OLED) display or displays of other types.

The voice receiving device 112 is, for example, a microphone for receiving an audio signal. In an embodiment, the voice receiving device 112 is used to receive the voice message and a voice command spoken by the user, and convert an audio signal into an analog electrical signal.

The communication element 113 is used to wirelessly or wiredly connect to the network N1, which may include a wired/wireless network card, a wireless communication chip or an antenna so that the mobile device 110 may be connected to the information management server 130 through the network N1. For example, the communication element 113 may include a Wifi communication chip and an antenna.

The storage device 114 is configured to store data, software modules, programming codes, and may be, for example, a stationary or mobile device in any form such as a random access memory (RAM), a read-only memory (ROM), a flash memory, a hard drive or other similar devices, an integrated circuit and a combination of the above.

The processor 115 is coupled to the display 111, the voice receiving device 112, the communication element 113 and the storage device 114, and configured to execute the proposed method for task management, and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices, chips, integrated chips and a combination of the above. In the embodiments of the disclosure, the processor 115 may load the program codes or the modules recorded in the storage device 114 to execute the method for task management proposed by the embodiments of the disclosure.

However, in addition to the display 111, the voice receiving device 112, the communication device 113, the storage device 114 and the processor 115, the mobile device 110 may further include other elements not shown in FIG. 2A, such as a speaker, a sensor, a camera or the like. Embodiments of the disclosure are not limited in this regard.

Figure 2B:
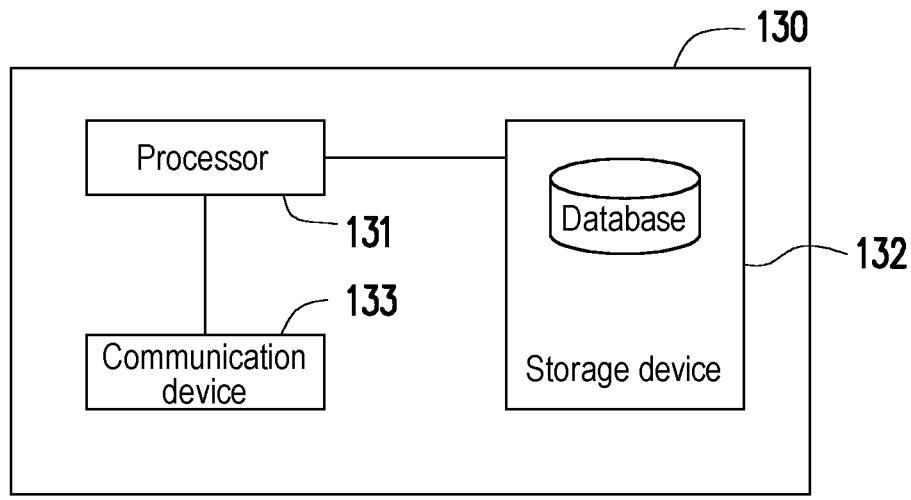
FIG. 2B is a schematic diagram of an information management server according to an embodiment of the disclosure.

FIG. 2B is a schematic diagram of an information management server according to an embodiment of the disclosure. Nonetheless, it should be understood that, the example of FIG. 1 is merely exemplary instead of limitations to the disclosure. Referring to FIG. 2B, the information management server 130 may include a processor 131, a storage device 132 and a communication device 133.

The storage device 132 is configured to store data, software modules, programming codes, and may be, for example, a stationary or mobile device in any form such as a random access memory (RAM), a read-only memory (ROM), a flash memory, a hard drive or other similar devices and a combination of the above. The storage device 132 is stored with the database DB, and the database DB is recorded with the task management information and the staff management information.

The communication device 133 is used to connect to the network N1, and transmit data to other network devices through the network N1 or receive data from the other network devices (e.g., the mobile devices 110 and 120) through the network N1. The communication device 133 is, for example, a network interface supporting Ethernet, an optical fiber network or other network standards.

The processor 131 is configured to execute the proposed method for task management, and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices, chips, integrated chips and a combination of the above. In the embodiments of the disclosure, the processor 131 may load the program codes, the database DB or the modules recorded in the storage device 132 to execute the method for task management proposed by the embodiments of the disclosure.

In an embodiment, the information management server 130 may be a device with computing function such as a computer, a workstation, a cloud server or a combination of the above devices. The embodiment of the disclosure does not limit the type of the information management server 130. From another perspective, the information management server 130 may also be implemented by a cloud computing platform that provides multiple cloud services, such as Microsoft Azure, Amazon Web Services or the like.

In an embodiment, the mobile devices 110 and 120 and the information management server 130 may implement a data transfer between the mobile devices 110 and 120 and the information management server 130 through a web application program interface (Web API). In addition, the mobile devices 110 and 120 may also use the Advanced Message Queuing Protocol (AMQP) to establish a communication connection with an Iot Hub in the information management server 130 to achieve the data transfer.

Figure 3:
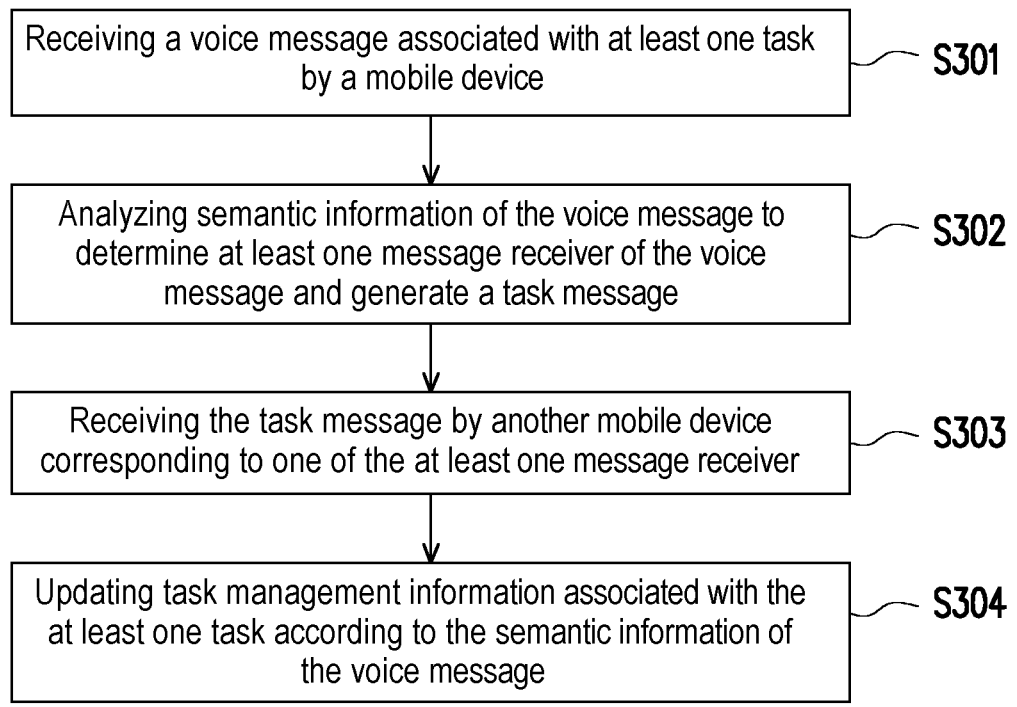
FIG. 3 is a flowchart of a method for task management according to an embodiment of the disclosure.

FIG. 3 is a flowchart of a method for task management according to an embodiment of the disclosure. Referring to FIG. 1 and FIG. 3, the method of the present embodiment is adapted to the system for task management 10 in the foregoing embodiment, and detailed steps in the method for task management of the present embodiment are described below in conjunction with each element in the system for task management 10.

In step S301, the mobile device 110 receives a voice message associated with at least one task. Specifically, the mobile device 110 may receive the voice message spoken by the user A, and perform a speech to text (STT) process on the voice message to generate a corresponding text content. The mobile device 110 may transmit the text content to the information management server 130 through the network N1. In another embodiment, the mobile device 110 transmits the voice message spoken by the user A to the information management server 130 through the network N1, and the information management server 130 performs the speech to text process to generate the corresponding text content.

In step S302, the information management server 130 analyzes semantic information of the voice message to determine at least one message receiver of the voice message and generate a task message. In step S303, another mobile device 120 receives the task message and provides the task message to one of the at least one message receiver. In step S304, the information management server 130 updates task management information associated with the at least one task according to the semantic information of the voice message.

Specifically, after the information management server 130 receives the text content of the voice message, the information management server 130 may analyzes the semantic information of the voice message by using a Natural Language Understanding (NLU) technology. The Natural Language Understanding technology may be responsible for extracting the keyword in the voice message, and may determine a user intension so as to execute subsequent processes corresponding to the user intension. In an embodiment, the information management server 130 may analyze the semantic information of the voice message, and determine the message receiver and generate the task message according to the semantic information of the voice message. The information management server 130 may extract the keyword in the received text content to obtain the user intension and execute a corresponding operation. Here, the corresponding operation at least includes updating data in the database DB and providing the task message to the at least one message receiver. However, a relationship between the keyword, the user intentions and the corresponding operation may be designed according to actual needs, which is not limited in the embodiments of the disclosure.

For instance, when the user A speaks out the voice message "I want to assign a task to Anna" to the mobile device 10, the information management server 130 may extract the keywords "Assign task" and "Anna" from "I want to assign a task to Anna". Then, the information management server 130 executes corresponding actions to assign the task, such as adding the task management information of the task to the database DB to update the task management information in the database DB, and sending the task message "Please handle the task" to the mobile device 120 of the message receiver "Anna".

It is worth noting that, in an embodiment, the information management server 130 may also update the staff management information associated with the at least one staff member in the database according to the semantic information of the voice message. For instance, when the user B speaks out the voice message "I have completed the task" to the mobile device 120, the information management server 130 may extract the keyword "Task completed" from "I have completed the task". Then, the information management server 130 executes corresponding actions for the completed task, which include modifying the task management information of the task and the staff management information of the staff member "User B" to update the task management information and the staff management information in the database DB, and sending the task message "User B has completed the task" to the mobile device 110 of the task manager. Based on the flow of FIG. 3, it can be known that, the task management information and/or the staff management information in the database DB may be updated, modified or added in response to the voice message received by the mobile device 110 or the mobile device 120. In this way, the system for task management 10 may be applied to different workplaces or activities to achieve a work progress tracking and a staff member control.

For example, Table 1 is a rule list for the keyword according to an embodiment of the disclosure. The information management server 130 may confirm the action of the staff member according to the keyword in the voice message, and correspondingly execute the actions corresponding to the keyword, so as to update the staff management information associated with the at least one staff member in the database according to the keyword in the voice message. For example, when the voice message includes the keyword "Off work", the information management server 130 will perform a corresponding action of punch in to finish working, which includes registering a punch in time of that specific staff member. In addition, in an embodiment, the information management server 130 may perform a voiceprint recognition based on the voice message to verify whether the staff member who spoke out the keyword is a legitimate user of the mobile device 110 to prevent others from pretending to be the legitimate user of the mobile device 110.

TABLE 1

| Keyword | Execution action |
| --- | --- |
| Start working | Recording information regarding punch in to start working in the staff management information in the database |
| Finish working | Recording information regarding punch in to finish working in the staff management information in the database |
| Off work | Recording information regarding punch in to finish working in the staff management information in the database |
| Log out | Log off |
| Log off | Log off from application |
| Restart | Restart application |
| Confirm task | Obtaining a task list from the task management information in the database, and sending the task list to the mobile device for the user to confirm a task status. |
| Task taken | Recording the task being executed in the task management information in the database, and recording the staff member working on the task in the staff management information |
| Help | Requesting support: sending a help message |
| Completed | Task completed: recording the task being completed in the task management information in the database, and recording a task completion time. |
| Assign task | Task assignment: assigning the task to the staff member, and sending the task message to the respective mobile device. |
| Transmit message | Communication: transmitting the voice message to the mobile device |
| Read message | Communication: reading the message (the mobile device may broadcast or remind the number of messages to be read) |

According to the example of Table 1, when the staff member speaks out the voice message including the keyword "Confirm task", the information management server 130 may obtain the task list from the task management information recorded by the database, and provide the task list to one specific mobile device so that the staff member of that specific mobile device may learn of which tasks have not been executed. Correspondingly, after the staff member decides to execute one specific task, the staff member may speak out the voice message including the keyword "Task taken". When staff member speaks out the voice message including the keyword "Task taken", the information management server 130 may record the specific task being executed in the task management information in the database, and record the current working status of that staff member as executing the task in the staff management information.

For example, Table 2 is a rule list of natural language according to an embodiment of the disclosure. The information management server 130 may determine a semantic intention of the voice message according to the rule list of natural language, so as to confirm an execution action of the staff member according to the semantic intention and update the staff management information or the task management information associated with the at least one staff member in the database according to the semantic intention of the voice message. For example, when the voice message include "Send a message to the cleaning group", the information management server 130 may obtain the semantic intention "Send a message to a group" and the keyword "the cleaning group", accordingly provide a user input interface for the user to input the message, then send the message to the cleaning group or send the voice message later transmitted by the user to the cleaning group.

TABLE 2

| Utterance | Semantic intention | Execution action |
|---|---|---|
| Read a message from Derek | Read a message | Providing a message to the mobile device |
| Send a message to Derek | Transmit a message | Transmitting a message to the mobile device |
| I want to assign task a to Derek | Assign a task | Assigning a task to the staff member |
| Reply a message to Derek | Reply a message | Transmitting a replay message to the mobile device |
| I want to check Shophie's task | Confirm a task | Providing the task list or the task management information |
| Transmit a message to the cleaning group | Transmit a message to a group | Transmitting a message to the mobile device corresponding to the group |
| Ready to get off work | Punch in to finish working | Correspondingly recording an off-duty time in the staff management information |
| Please log off | Log off from application | Log a specific user out of the system |
| I need help | Request for help | Sending a help message |
| I have completed task of room 801 | Task completed | Correspondingly recording a task completion time in the task management information and recording a working status and time in the staff management information |
| Shophie is checking in | Punch in to start working | Correspondingly recording an on-duty time in the staff management information |

Figure 4:
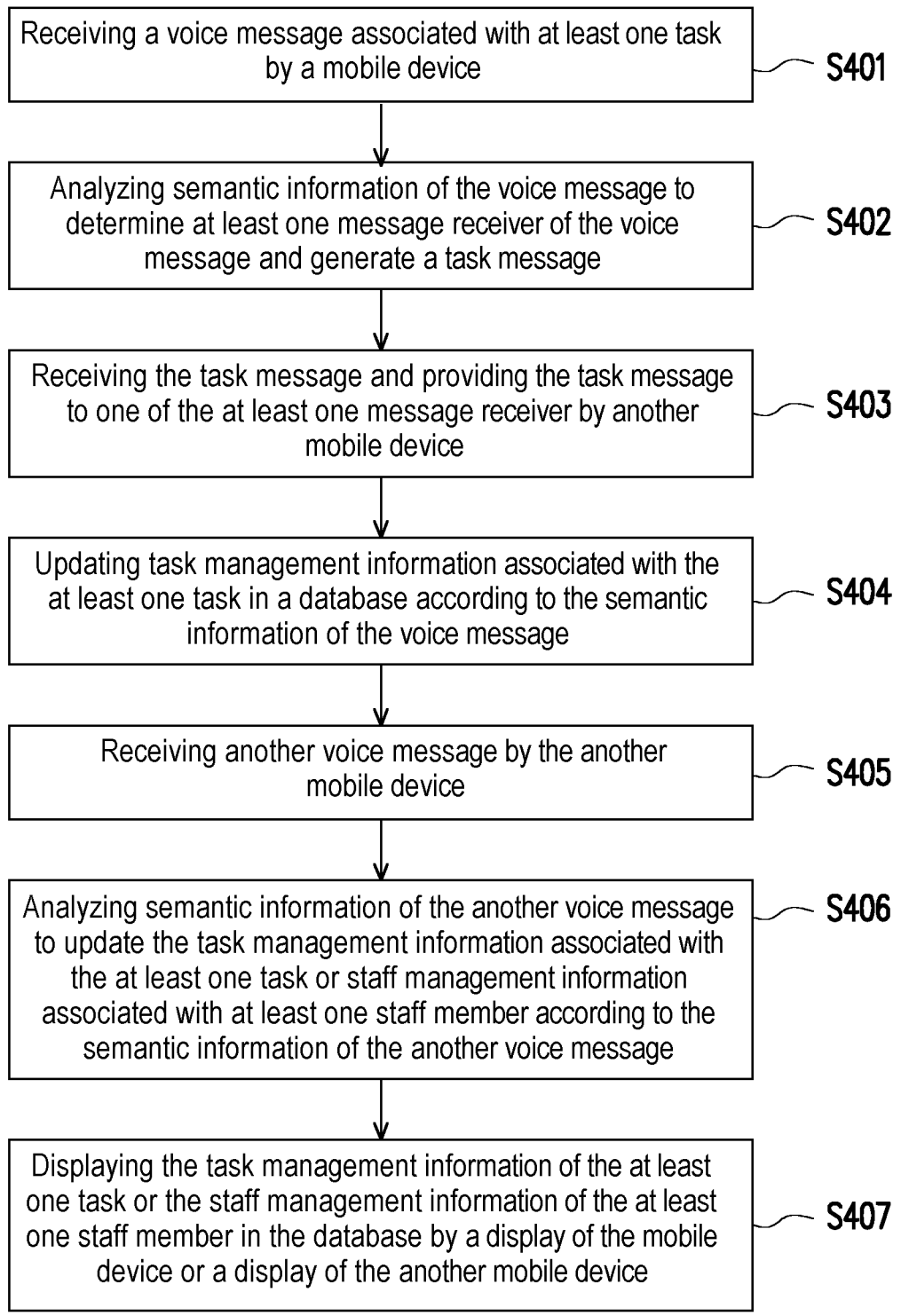
FIG. 4 is a flowchart of a method for task management according to an embodiment of the disclosure.

FIG. 4 is a flowchart of a method for task management according to an embodiment of the disclosure. Referring to FIG. 1 and FIG. 4, the method of the present embodiment is adapted to the system for task management 10 in the foregoing embodiment, and detailed steps in the method for task management of the present embodiment are described below in conjunction with each element in the system for task management 10.

In step S401, the mobile device 110 receives a voice message associated with at least one task. In step S402, the information management server 130 analyzes semantic information of the voice message to determine at least one message receiver of the voice message and generate a task message. In step S403, another mobile device 120 receives the task message and provides the task message to one of the at least one message receiver. In step S404, the information management server 130 updates task management information associated with the at least one task in the database according to the semantic information of the voice message. Step S401 to step S404 are similar to step S301 to step S304, and are thus not repeatedly described herein.

It is worth mentioning that, in an embodiment, the information management server 130 determines a task characteristic of the at least one task according to the semantic information of the voice message. The task characteristic is, for example, a task location or a task type. Next, the information management server 130 determines a working department according to the task characteristic of the at least one task, and setting at least one staff member of the working department as the at least one message receiver. For example, in the workplace of hotel management, the information management server 130 may determine the task characteristic of one specific task as a housekeeping based on the semantic information of the voice message, and set each housekeeping personnel of a housekeeping department as the message receiver so that each housekeeping personnel at work receives the task message through their respective mobile devices. Alternatively, in the workplace of supermarket management, the information management server 130 may determine the task characteristic of a specific task as a fresh refrigerator item according to the semantic information of the voice message, and set each supermarket personnel near a fresh refrigerator as the message receiver.

It should noted that, after the another mobile device 120 receives the task message and provides the task message to one of the at least one message receiver, in step S405, the another mobile device 120 receives another voice message. Similarly, the mobile device 120 may receive another voice message spoken by the user B, and perform the speech to text process on the another voice message to generate a corresponding text content. The mobile device 120 may transmit the text content to the information management server 130 through the network N1.

In step S406, the information management server 130 analyzes semantic information of the another voice message, so as to update the task management information associated with the at least one task or the staff management information associated with the at least one staff member according to the semantic information of the another voice message. In view of the above, is can be known that, the task management information and/or the staff management information in the database DB may be updated, modified or added in response to a conversation content received by the mobile device 110 or 120.

In an application example, based on the execution of step S401 to step S404, the task assignor may assign the task to the staff members in a specific group by speaking out the voice message. The information management server 130 may send the task message to multiple mobile devices respectively held by multiple message receivers in the specific group, add the task management information of the task, and adjust the uncompleted quantity of the task. In addition, based on execution of step S405 to step S406, the task executor who decided to take the task may take the task by speaking out another voice message. The information management server 130 may modify the task management information of the task being taken and adjust the working status of the task executor to "At work".

It is worth noting that, in step S407, the display of the mobile device 110 displays the task management information of at least one task and the staff management information of the at least one staff member in the database DB. Specifically, the mobile device 110 may receive the task management information and the staff management information in the database DB from the information management server 130 through the network N1, and display the task management information or the staff management information on a user interface of an application. Here, the task management information may include independent information for each task and statistical information for all the tasks. Similarly, the staff management information may include independent information for each staff member and statistical information for all the staff members. In this way, the task manager may efficiently perform work scheduling and manpower scheduling through voice according to the information displayed on the user interface. It can be seen that in response to the mobile device receiving the voice message and the user intension of the voice message meeting a specific condition, the information management server 130 may re-calculate the statistical information for all the tasks and the statistical information for all the staff members.

In an embodiment, the staff member may complete the action of punch in to start working by speaking out a specific sentence to the mobile device. Specifically, the another mobile device 120 receives yet another voice message. The information management server 130 may recognize a voiceprint feature of the yet another voice message to determine a staff member corresponding to the voiceprint feature. The information management server 130 analyzes semantic information of the yet another voice message to update the staff management information associated with the staff member in the database according to the semantic information of the yet another voice message. Specifically, the information management server 130 may determine whether the voiceprint feature of the yet another voice message matches a sample voiceprint feature in the database DB, so as to determine the staff member corresponding to the voiceprint feature. For example, the staff member may speak out the voice message "Start working" to the mobile device 120. The information management server 130 analyzes the semantic information of the voice message "Start working", recognizes the voiceprint feature, and compares the voiceprint feature with the sample voiceprint features of all the staff members in the database DB, so as to determine the staff member corresponding to the voiceprint feature. Then, the information management server 130 may modify the working status of the staff member corresponding to the voiceprint feature in the database DB from "Off-duty" to "On-duty" and record a time of punch in to start working together. Similarly, the staff member may complete the action of punch in to finish working by speaking out a specific sentence to the mobile device. The information management server 130 may modify the working status of the staff member corresponding to the voiceprint feature in the database DB from "On-duty" to "Off-duty" and record a time of punch in to finish working together. With this voiceprint verification, it is possible to prevent an illegal user from pretending to be the legitimate user of the mobile device and conducting the action of punch in.

Figure 5:
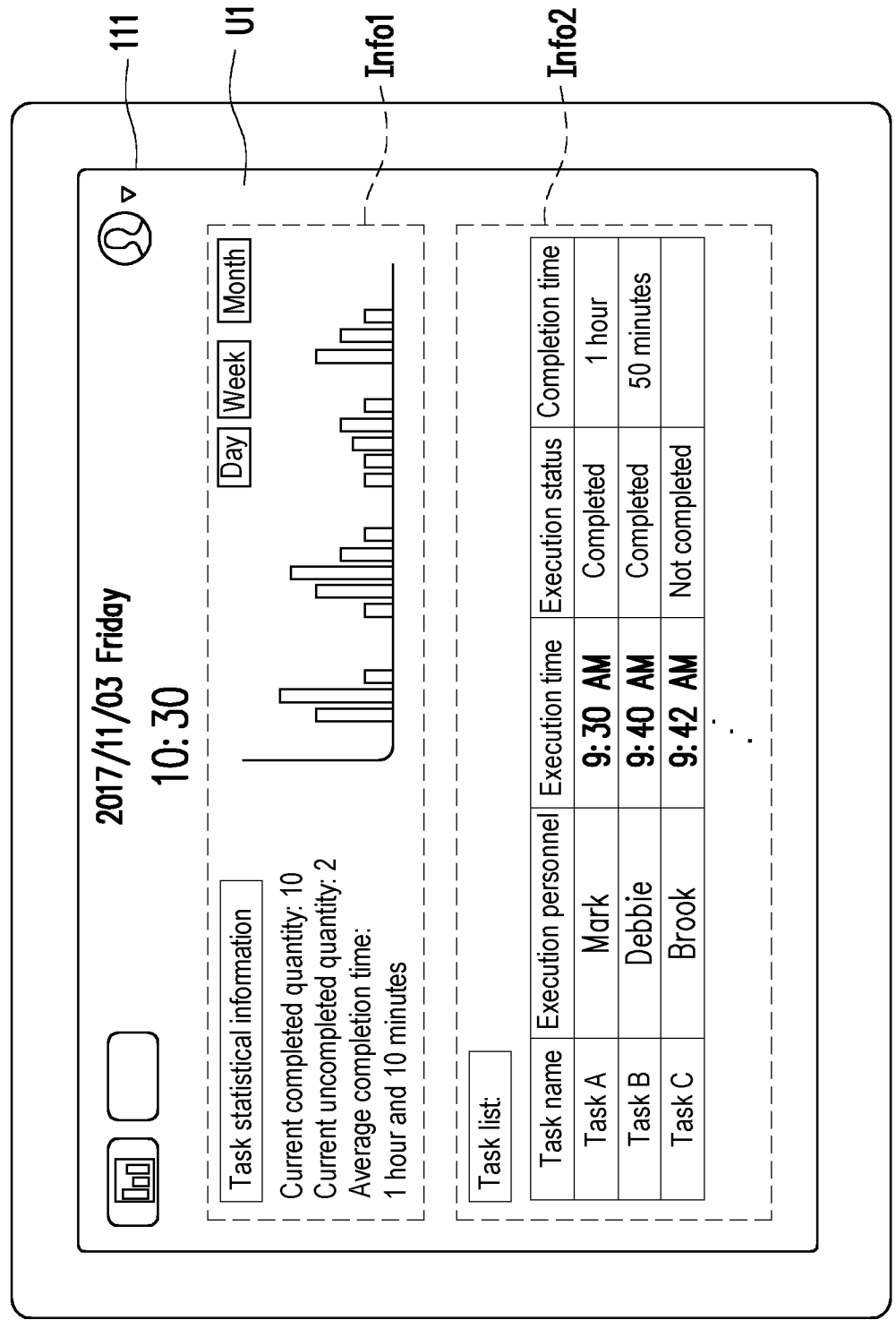
FIG. 5 is a schematic diagram for displaying task management information according to an embodiment of the disclosure.

FIG. 5 is a schematic diagram for displaying task management information according to an embodiment of the disclosure. Referring to FIG. 5, the display 111 of the mobile device 110 may display a user interface U1 according to the task management information provided by the database DB. The user interface U1 presents the task management information including task statistical information Info1 and a task list Info2. The task statistical information Info1 includes statistical information within a statistical time period (e.g., 1 day, 1 week or 1 month), such as a current completed quantity, a current uncompleted quantity and an average completion time of the multiple tasks. The task list Info2 may display task details for all the tasks, including a task name, an execution personnel, an execution time, an execution status and a completion time. In this way, the task manager may clearly monitor an individual execution status and an overall execution status for each task through the user interface U1. It can be seen that, in response to the voice message for assigning a specific task given by the task manager through the mobile device 110, the task management information displayed on the user interface U1 is also updated accordingly. For example, the task list Info2 is added with a piece of task information, and the current uncompleted quantity is also increased by 1. Similarly, in response to the voice message for taking the specific task given by the task executor through the mobile device 120, the task management information displayed on the user interface U1 is also updated and adjusted accordingly.

Figure 6:
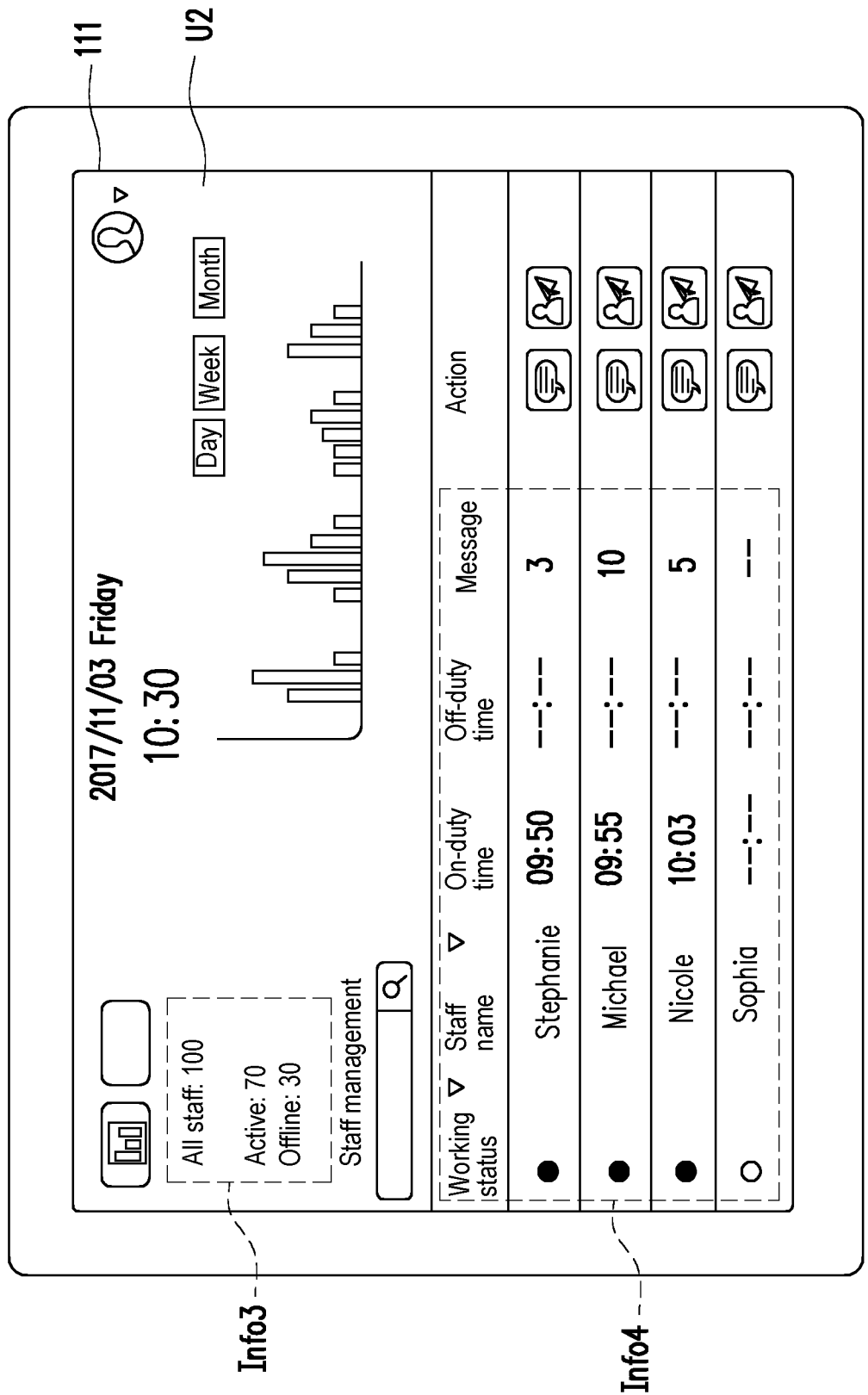
FIG. 6 is a schematic diagram for displaying staff management information according to an embodiment of the disclosure.

FIG. 6 is a schematic diagram for displaying staff management information according to an embodiment of the disclosure. Referring to FIG. 6, the display 111 of the mobile device 110 may display a user interface U2 according to the staff management information provided by the database DB. The user interface U2 presents the staff management information including staff statistical information Info3 and a staff list Info4. The staff statistical information Info3 includes a total number of staff members (i.e., All staff), a number of staff members working (i.e., Active), and a number of staff members not working (i.e., Offline). The staff list Info4 includes staff information of each staff member, such as the on-duty time, the off-duty time, the current working status and the like. It can be known that, in response to the voice message for taking a specific task given by the task executor through the mobile device 120, the staff management information displayed on the user interface U2 is also updated and adjusted accordingly. For example, the working status of the staff member who took the task will be switched to "At work".

Figure 7:
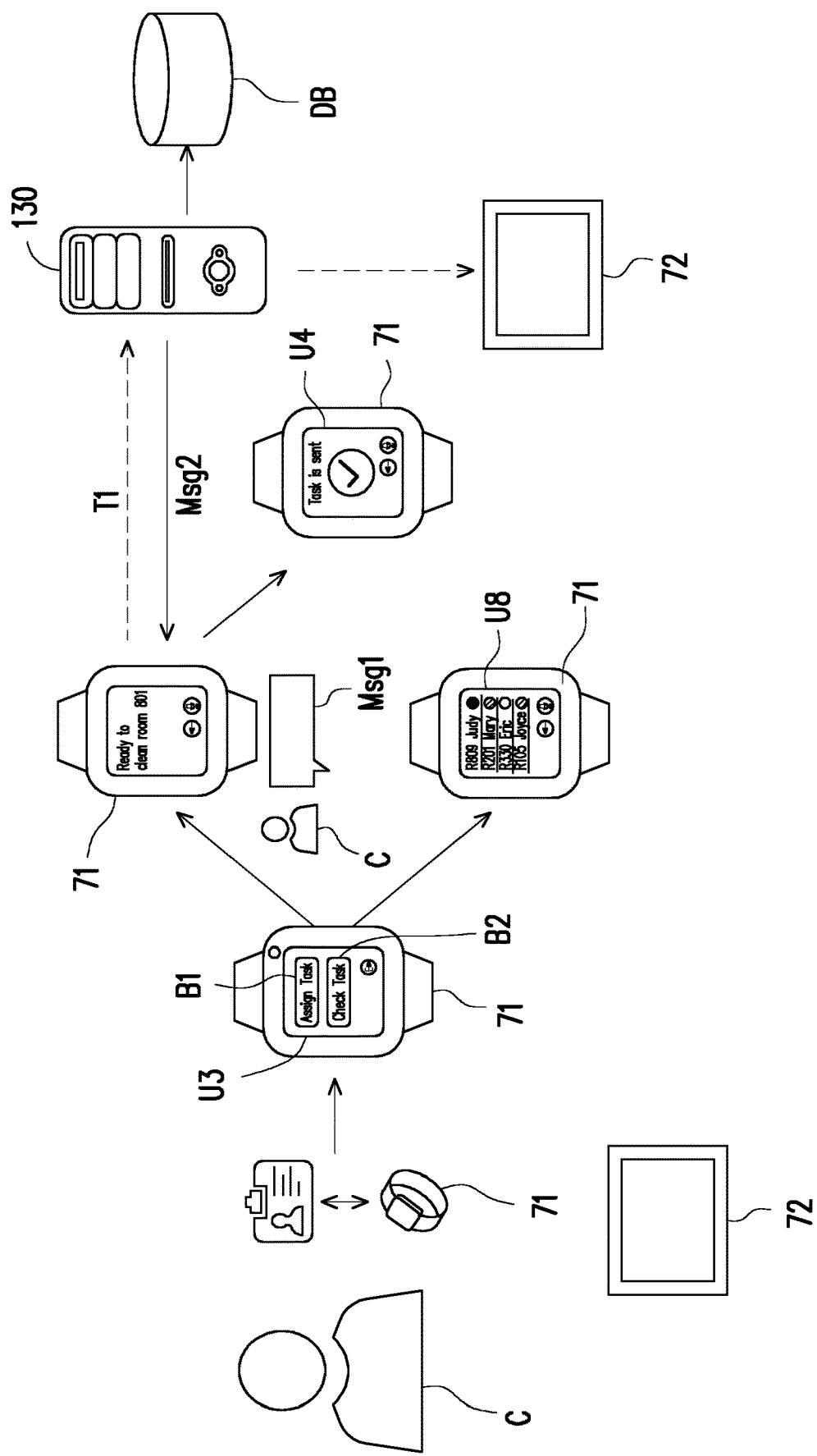
FIG. 7 is a schematic diagram of operations of a method for task management according to an embodiment of the disclosure.

FIG. 7 is a schematic diagram of operations of a method for task management according to an embodiment of the disclosure. Referring to FIG. 7, in this embodiment, the mobile device 110 of a task manager C may include a smart watch 71 and a tablet computer 72. After the task manager C uses an ID or the voiceprint recognition to log in to the system for task management using the smart watch 71, the smart watch 71 may display a user interface U3. The task manager C may first press a virtual button B1 of the user interface U3 to speak out a voice message Msg1, or directly speak out the voice message Msg1 to the smart watch 71. Then, the smart watch 71 may send a text content T1 of the voice message to the information management server 130 so the information management server 130 can perform the semantic recognition on the text content T1. After the semantic recognition is completed, the information management server 130 replies a confirmation message Msg2 to the smart watch 71. Accordingly, the smart watch 71 may display a user interface U4 to notify the task manager C that the task has been assigned. In addition, the information management server 130 updates the task management information in the database DB according to a semantic recognition result of the text content T1. On the other hand, when the task manager C presses a virtual button B2 of the user interface U3, a user interface U8 displayed on the smart watch 71 may present the task management information for each task, such as the current execution status and the corresponding execution personnel of the task. In the user interface U8, the current execution status of the task may be represented by icons in specific colors or styles. In this example, the current execution status of the task may be represented by dots of different colors. In addition, if the task manager C wants to view the task management information and the staff management information with more details, the task manager C may use a large screen of the tablet computer 72 to display the user interfaces U1 and U2 shown in FIG. 5 or FIG. 6.

Figure 8:
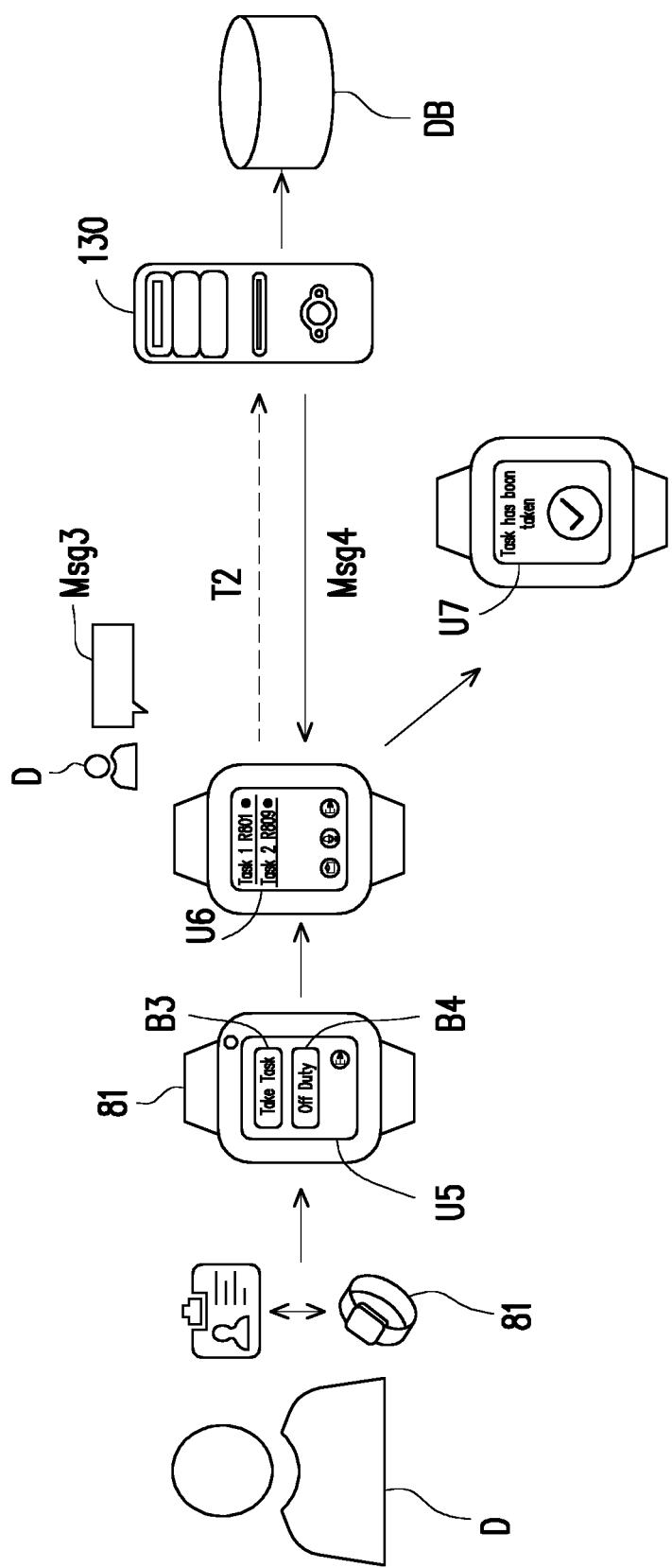
FIG. 8 is a schematic diagram of operations of a method for task management according to an embodiment of the disclosure.

FIG. 8 is a schematic diagram of operations of a method for task management according to an embodiment of the disclosure. Referring to FIG. 8, in this embodiment, the mobile device 120 of a task executor D may include a smart watch 81. After the task executor D uses an ID or the voiceprint recognition to log in to the system for task management using the smart watch 81, the smart watch 81 may display a user interface U5. The task executor D may press a virtual button B3 of the user interface U5 to check the task currently waiting to be executed, or the task executor D may press a virtual button B4 of the user interface U5 to perform the action of punch in to finish working according the voiceprint verification. In response to the virtual button B3 pressed by the task executor D, the smart watch 81 may display a user interface U6. Accordingly, the task executor D may speak out a voice message Msg3 for taking the task to the smart watch 81. Then, the smart watch 81 may send a text content T2 of the voice message to the information management server 130 so the information management server 130 can perform the semantic recognition on the text content T2. After the semantic recognition is completed, the information management server 130 replies a confirmation message Msg4 to the smart watch 81. Accordingly, the smart watch 81 may display a user interface U7 to notify the task executor D. In addition, the information management server 130 updates the task management information in the database DB in response to a semantic recognition result (i.e., the semantic information) of the text content T2.

Figure 9:
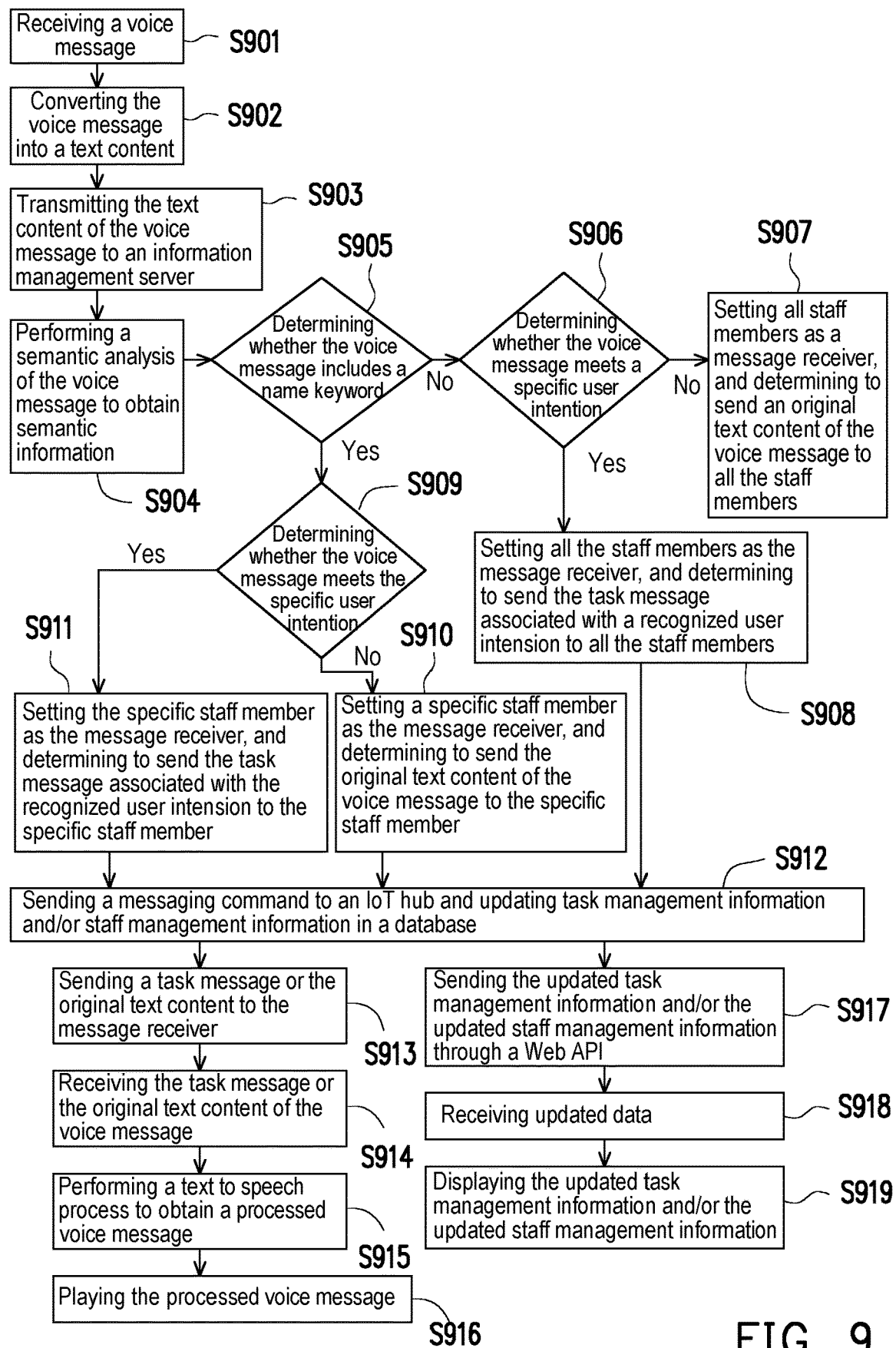
FIG. 9 is a flowchart of a method for task management according to an embodiment of the disclosure.

FIG. 9 is a flowchart of a method for task management based on voice intercom function according to an embodiment of the disclosure. It should be noted that the following description uses the mobile device 110 of FIG. 1 as a talker and the mobile device 120 as a listener, for example. Similarly, the mobile device 110 may also serve as the listener, and the mobile device 120 may also serve as the talker.

Referring to FIG. 9, in step S901, the mobile device 110 receives a voice message. In step S902, the mobile device 110 converts the voice message into a text content. In step S903, the mobile device 110 transmits the text content of the voice message to the information management server 130. In step S904, the information management server 130 performs a semantic analysis of the voice message to obtain semantic information. In another embodiment, the m 110 transmits the voice message to the information management server 130 so that the information management server 130 converts the voice message into the text content and performs the semantic analysis of the voice message to obtain the semantic information. In step S905, the information management server 130 determines whether the voice message includes a name keyword of a specific staff member according to the semantic information. If the determination in step S905 is No, in step S906, the information management server 130 determines whether the voice message meets a specific user intention according to semantic information. If the determination in step S906 is No, in step S907, the information management server 130 sets all staff members as a message receiver, and determines to send an original text content of the voice message to all the staff members.

If the determination in step S906 is Yes, in step S908, the information management server 130 sets all the staff members as the message receiver, and determines to send the task message associated with a recognized user intension to all the staff members. If the determination in step S905 is Yes, in step S909, the information management server 130 determines whether the voice message meets the specific user intention according to the semantic information. If the determination in step S909 is No, in step S910, the information management server 130 sets a specific staff member as the message receiver, and determines to send the original text content of the voice message to the specific staff member. If the determination in step S909 is Yes, in step S911, the information management server 130 sets the specific staff member as the message receiver, and determines to send the task message associated with the recognized user intension to the specific staff member.

In step S912, the information management server 130 sends a messaging command to an IoT hub and updates task management information and/or staff management information in the database DB. In step S913, the IoT Hub of the information management server 130 sends a task message or the original text content to another mobile device 120 of the message receiver. In this embodiment, in step S914, the another mobile device 120 receives the task message or the original text content of the voice message from the information management server 130. In step S915, the another mobile device 120 performs a text to speech process to obtain a processed voice message. In step S916, a speaker of the another mobile device 120 plays the processed voice message. In addition, after step S912, in step S917, the information management server 130 sends the updated task management information and/or the updated staff management information to the mobile device 110 or the mobile device 120 through a Web API. In step S918, the mobile device 110 or the mobile device 120 receives updated data. In step S919, the mobile device 110 or the mobile device 120 displays the updated task management information and/or the updated staff management information.

In summary, in the embodiments of the disclosure, not only can the user assign tasks and receive tasks through voice communication between the mobile devices, the task management information of the task and the staff management information may also be updated according to the semantic information of the voice message so that the updated task management information and the updated staff management information may then be displayed by the mobile devices. In this way, the convenience and efficiency for controlling the tasks and staff members can be greatly improved. In addition, all the voice messages can be recorded in the database to form a work log. Furthermore, the information management server may update the database in real time in response to the voice message of the user, so that the task manager is able to quickly understand the progress of work execution in order to effectively schedule manpower.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A method for task management based on voice intercom function, the method comprising:
receiving a voice message associated with at least one task by a mobile device;
analyzing semantic information of the voice message to determine at least one message receiver of the voice message and generate a task message;
receiving the task message by another mobile device corresponding to one of the at least one message receiver; and
updating task management information associated with the at least one task according to the semantic information of the voice message.

2. The method for task management based on voice intercom function of claim 1, the method further comprising:
updating staff management information associated with at least one staff member according to the semantic information of the voice message.

3. The method for task management based on voice intercom function of claim 2, wherein after the step of receiving the task message by the another mobile device corresponding to one of the at least one message receiver, the method further comprises:
receiving another voice message by the another mobile device; and
analyzing semantic information of the another voice message to update the task management information associated with the at least one task or the staff management information associated with the at least one staff member according to the semantic information of the another voice message.

4. The method for task management based on voice intercom function of claim 3, the method further comprising:
displaying the task management information of the at least one task or the staff management information of the at least one staff member by a display of the mobile device or a display of the another mobile device.

5. The method for task management based on voice intercom function of claim 2, wherein the staff management information of the at least one staff member comprises an on-duty time, an off-duty time, a current working status, a number of tasks completed or a combination thereof.

6. The method for task management based on voice intercom function of claim 3, the method further comprising:
receiving yet another voice message by the another mobile device;
recognizing a voiceprint feature of the yet another voice message to determine a staff member corresponding to the voice feature; and
analyzing semantic information of the yet another voice message to update the staff management information associated with the staff member according to the semantic information of the yet another voice message.

7. The method for task management based on voice intercom function of claim 1, wherein the task management information of the at least one task comprises an execution status of the at least one task, a completed quantity and an uncompleted quantity of the at least one task, an execution time of the at least one task or a combination thereof.

8. The method for task management based on voice intercom function of claim 1, wherein the step of analyzing the semantic information of the voice message to determine the at least one message receiver of the voice message and generate the task message comprises:
determining a task characteristic of the at least one task according to the semantic information of the voice message; and
determining a group according to the task characteristic of the at least one task, and setting at least one staff member of the group as the at least one message receiver.

9. A system for task management based on voice intercom function, comprising:
a first mobile device, using a voice receiving device to receive a voice message associated with at least one task, wherein at least one message receiver is determined according to semantic information of the voice message, and a task message is generated according to the semantic information of the voice message; and
a second mobile device, receiving the task message, the second mobile device corresponding to one of the at least one message receiver,
wherein the first mobile device or the second mobile device displays task management information of the at least one task, and the task management information of the at least one task is updated according to the semantic information of the voice message.

10. The system for task management based on voice intercom function of claim 9, wherein staff management information associated with at least one staff member is updated according to the semantic information of the voice message.

11. The system for task management based on voice intercom function of claim 10, wherein after the second mobile device receives the task message, the second mobile device receives another voice message, and the task management information of the at least one task and the staff management information associated with the at least one staff member are updated according to semantic information of the another voice message.

12. The system for task management based on voice intercom function of claim 11, wherein the first mobile device or the second mobile device displays the task management information of the at least one task or the staff management information of the at least one staff member.

13. The system for task management based on voice intercom function of claim 10, wherein the staff management information of the at least one staff member comprises an on-duty time, an off-duty time, a current working status, a number of tasks completed or a combination thereof.

14. The system for task management based on voice intercom function of claim 9, wherein the task management information of the at least one task comprises an execution status of the at least one task, a completed quantity and an uncompleted quantity of the at least one task, an execution time of the at least one task or a combination thereof.

15. A mobile device, comprising:
a display;
a voice receiving device;
a communication element, connected to a network;
a storage device; and
a processor, coupled to the display, the voice receiving device, the communication element and the storage device, and configured to:

receive a voice message associated with at least one task by the voice receiving device; and use the communication element to receive task management information of the at least one task from an information management server, so as to display the task management information of the at least one task by using the display, wherein the task management information of the at least one task is updated according to semantic information of the voice message, wherein at least one message receiver is determined according to the semantic information of the voice message, a task message is generated according to the semantic information of the voice message, and the communication element provides the task message to the at least one message receiver.

16. The mobile device of claim 15, wherein at least one staff member is associated with the task, staff management information of the at least one staff member is updated according to the semantic information of the voice message, and the processor is configured to: use the communication element to receive the staff management information of the at least one staff member from the information management server, so as to display the staff management information of the at least one staff member by using the display.

17. The mobile device of claim 16, wherein the staff management information of the at least one staff member comprises an on-duty time, an off-duty time, a current working status, a number of tasks completed or a combination thereof.

18. The mobile device of claim 15, wherein the task management information of the at least one task comprises an execution status of the at least one task, a completed quantity and an uncompleted quantity of the at least one task, an execution time of the at least one task or a combination thereof.

* * * * *